UNITED STATES PATENT OFFICE.

HERMANN KETTMANN, OF ESCHERSHAUSEN, BRUNSWICK, GERMANY.

PROCESS OF MANUFACTURING ASPHALTIC POWDER SUITABLE FOR PAVING.

SPECIFICATION forming part of Letters Patent No. 310,594, dated January 13, 1885.

Application filed September 22, 1884. (No specimens.) Patented in England September 15, 1884, No. 12,425.

*To all whom it may concern:*

Be it known that I, HERMANN KETTMANN, a subject of the Duke of Anhalt, residing at Eschershausen, in the dukedom of Brunswick, German Empire, have invented certain new and useful Improvements in the Process of Manufacturing Asphaltic Powder Suitable for Paving; and I do hereby declare the following to be a full, clear, and exact description of the invention, such as will enable others skilled in the art to which it appertains to make and use the same.

The modes of producing asphaltum concretes for paving and for other purposes now known or in use, either by mixing asphaltum with permeable substances—such as rock, limestone, and other—or with impermeable substances—such as sand, glass, &c.—and bituminous substances or with a combination of these, do not permit of that intimate and uniform impregnation or coating of the materials required for the purposes intended.

This invention has for its object to effect the intimate combination, either by impregnation or coating of the bituminous substance or substances with the permeable and impermeable substances; and it consists, essentially, in reducing the permeable or impermeable substances, or a combination of such, by admixture of water to a fluid magma, and then mixing therewith, under the influence of heat, the bituminous substance or substances. It is obvious that the bituminous substance or substances according to this process will more readily, completely, and intimately impregnate or envelop the particles of the permeable or impermeable substances, owing to their suspension in water. The effect is the same as that which results from the pouring of a hydrocarbon into water, the heated bituminous substance spreading over the entire surface of the particles of the permeable or impermeable substances the same as it spreads over the entire surface of the water, so that by the subsequent heating and elimination of the water from the particles the bituminous substance will take its place and produce a most intimate and uniform impregnation or coating of the same.

In carrying out my invention I take crude asphaltum—either crude Trinidad or Mexican asphaltum, or crude bitumen—and free the same from its earthy constituents by the admixture of a hydrocarbon—such as the residues of petroleum or other suitable hydrocarbon—and reducing the mixture by heat to such a state of fluidity to permit of the subsidence or precipitation of such foreign constituents as are detrimental to its binding properties. The volume of hydrocarbon added to the asphaltum or bituminous substance should be so regulated that at a temperature varying from 17° to 33° centigrade the mixture will be stringy—that is to say, when handled it will draw out into strings—the heating after subsidence of the foreign matter referred to being continued until the hydrocarbon is driven out and the bituminous substance is of the proper consistency. The lime-rock or the asphaltic rock, poor in asphaltum or bitumen, is pulverized and converted into a fluid magma by the admixture of about forty per cent. of water, and heated to about 50° centigrade in a suitable vessel provided with stirrers. When the rock magma has been heated to the stated temperature, and while being agitated, the bituminous substance, freed from the foreign constituents as above set forth, and heated to about 70° centigrade, is gradually added to the rock magma, the impregnation or covering of the particles taking place almost instantaneously. During the successive mixing of the mass it is kept at the proper state of fluidity by the addition of water heated to about 60° or 70° centigrade. The proportion of the bituminous matter relatively to that of the rock magma may be varied within certain limits, and may reach fifteen per cent. of the dry pulverulent matter. The homogeneous mass so obtained may then be converted into blocks or bricks, either while yet hot or warm or after cooling, which blocks or bricks are then air-dried; or the fluid hot compound may be spread over a flat porous bed and then cut up into blocks, bricks, or pieces. The air-dried asphalt concrete is finally subjected to a temperature of about 110° centigrade in suitable retorts for the purpose of driving out the last traces of water and effecting the most intimate incorporation possible of the component parts without decomposing the bituminous matter. When cold, the bituminous blocks or bricks are pulverized and ready for use.

It is obvious that in lieu of the lime-rock or asphaltic rock other pulverized material or artificial materials may be employed, and the product obtained may be converted into blocks, bricks, tiles, or flags for paving and roofing purposes.

Having thus particularly described my invention, what I claim, and desire to secure by Letters Patent, is—

1. The herein-described process of producing asphaltic or bituminous concretes, which consists in mixing the asphaltum or bitumen with pulverized permeable or impermeable materials while the latter are held in suspension in water or while in the condition of magma by the admixture therewith of water.

2. The herein-described process of producing asphaltic or bituminous concretes, which consists in reducing the pulverized rock or other permeable or impermeable material into a magma by the addition of water, heating the same, mixing therewith heated asphaltum or bitumen, and expelling the water from the product, as set forth.

In testimony whereof I affix my signature in presence of two witnesses.

HERMANN KETTMANN.

Witnesses:
ADOLF DEMELIUS,
B. ROI.